(12) United States Patent
Burnett et al.

(10) Patent No.: US 8,768,127 B1
(45) Date of Patent: Jul. 1, 2014

(54) COMMUNICATION CABLE WITH DISTINGUISHABLE FIBER BUNDLES

(75) Inventors: Julie Anne Burnett, Acworth, GA (US); James Eldon Hocut, Dallas, GA (US)

(73) Assignee: Superior Essex International LP, Atlanta, GA (US)

( * ) Notice: Subject to any disclaimer, the term of this patent is extended or adjusted under 35 U.S.C. 154(b) by 151 days.

(21) Appl. No.: 13/334,624

(22) Filed: Dec. 22, 2011

Related U.S. Application Data

(60) Provisional application No. 61/460,790, filed on Jan. 7, 2011.

(51) Int. Cl.
*G02B 6/44* (2006.01)

(52) U.S. Cl.
USPC .......................................................... 385/110

(58) Field of Classification Search
USPC .......................................................... 385/110
See application file for complete search history.

(56) References Cited

U.S. PATENT DOCUMENTS

| | | | | |
|---|---|---|---|---|
| 2007/0098342 | A1* | 5/2007 | Temple et al. | 385/113 |
| 2011/0243514 | A1* | 10/2011 | Nave | 385/110 |
| 2011/0262088 | A1* | 10/2011 | Hurley et al. | 385/110 |

* cited by examiner

*Primary Examiner* — Sung Pak

(57) ABSTRACT

A fiber optic cable can comprise a jacket enclosing an internal space. A member extending lengthwise within the space can provide two or more compartments. Each compartment can house a respective bundle of optical fibers that are color coded for distinguishing the fibers of an individual bundle from one another. Different compartments can house different number of optical fibers. The compartments can comprise indicia for distinguishing the compartments and/or the bundles from one another. The member can be formed by extrusion and can have removable or detachable fins. With the extruded member in a relaxed state, the compartments can be closed. A series of dies can insert the bundles of optical fibers in the compartments. The dies can manipulate the member to open the compartments for bundle insertion. Once the bundles are inserted in the respective compartments, the dies can release the member so the compartments close on the bundles.

23 Claims, 11 Drawing Sheets

COMMUNICATION CABLE WITH DISTINGUISHABLE FIBER BUNDLES

CROSS REFERENCE TO RELATED APPLICATIONS

This patent application claims priority under 35 U.S.C. §119 to U.S. Provisional Patent Application No. 61/460,790, entitled "Color Coded Fiber Optic Cable" and filed Jan. 7, 2011, the entire contents of which are hereby incorporated herein by reference. This patent application is related to the patent application entitled "Method and System for Fabricating Communication Cable With Distinguishable Fiber Bundles," filed on the same day as the present application, the entire contents of which are hereby incorporated herein by reference.

FIELD OF THE TECHNOLOGY

The present technology relates to fiber optic cables and more specifically to a cable that incorporates indicia for distinguishing like bundles of optical fibers from one another, for example to facilitate cable servicing or installation or in manufacturing of pre-terminated fiber optic assemblies.

BACKGROUND

Fiber optic cables include one or more optical fibers or other optical waveguides that conduct optical signals, for example carrying voice, data, video, or other information. Small diameter cabling benefits data centers and other highly populated cabling systems by increasing the number of links between equipment in limited space. Air and cooling specifications for communications equipment rooms and data centers with dense electronic systems are stringent; and, as transmission speeds become faster, cooling demands typically increase. Therefore, compact links between electronics are generally desired. For example, to enhance the number and density of information channels, certain fiber optic cables include multiple bundles of optical fibers, with each bundle comprising two or more optical fibers.

The term "bundle," as used herein, generally refers to a group, set, collection, assemblage, arrangement or cluster of items that are together (typically gathered together), and "bundles" is the plural form of "bundle." The terms "fiber optic bundle" and "bundle of optical fibers" are used herein interchangeably. The terms "fiber optic bundles" and "bundles of optical fibers" are used herein interchangeably.

Accommodating new industry standards (for example the IEEE 100 Gigabits per second ("Gps") standard known as IEEE 802.3ba, released Jun. 17, 2010, covering 100 Gbs Ethernet) can involve multifiber connectors. Terminating or otherwise servicing cables that include multiple bundles of optical fibers typically entails distinguishing the bundles from one another. With many conventional technologies, differentiating the bundles involves labor intensive procedures like transmitting and receiving test signals or "ringing" the cable. Accordingly, improved technology is needed for distinguishing bundles of optical fibers of a cable from one another. Improved technology is further needed for making fiber optic cables that may incorporate a means for distinguishing bundles within the cable. A capability addressing such a need, or some related deficiency in the art, would promote fiber optic communications.

SUMMARY

For a fiber optic cable with two or more groups of visually indistinguishable optical fibers, the present technology supports distinguishing the groups from one another.

In one aspect of the present invention, a fiber optic cable can comprise multiple bundles of optical fibers. The bundles can have a common visual appearance, so that they are visually indistinguishable from one another to an unaided eye of an installer, a field service professional, or a technician. The fiber optic cable can comprise compartments, one for each bundle. For a two-bundle cable, one bundle can be located in one compartment, and another bundle can be located in a different compartment. For a multi-bundle cable having more than two bundles of optical fibers, bundles can be located in different compartments. The compartments can have indicia that distinguish the compartments and/or the bundles from one another. Accordingly, such an installer, field service professional, or technician can visually distinguish the bundles from one another. The indicia can comprise one or more colors, symbols, markings, signs, letters, numbers, digits, words, writings, alphanumeric symbols, codes, coatings, dyes, inks, prints, or messages, to mention a few representative examples without limitation.

The term "indicia," as used herein, generally refers to indications or distinguishing markings or signs.

The discussion of fiber optic cables presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with ordinary skill in the art upon examination of the following drawings and detailed description. It is intended that all such aspects, systems, methods, features, advantages, and objects are to be included within this description, are to be within the scope of the present invention, and are to be protected by the accompanying claims.

Figure 1A:
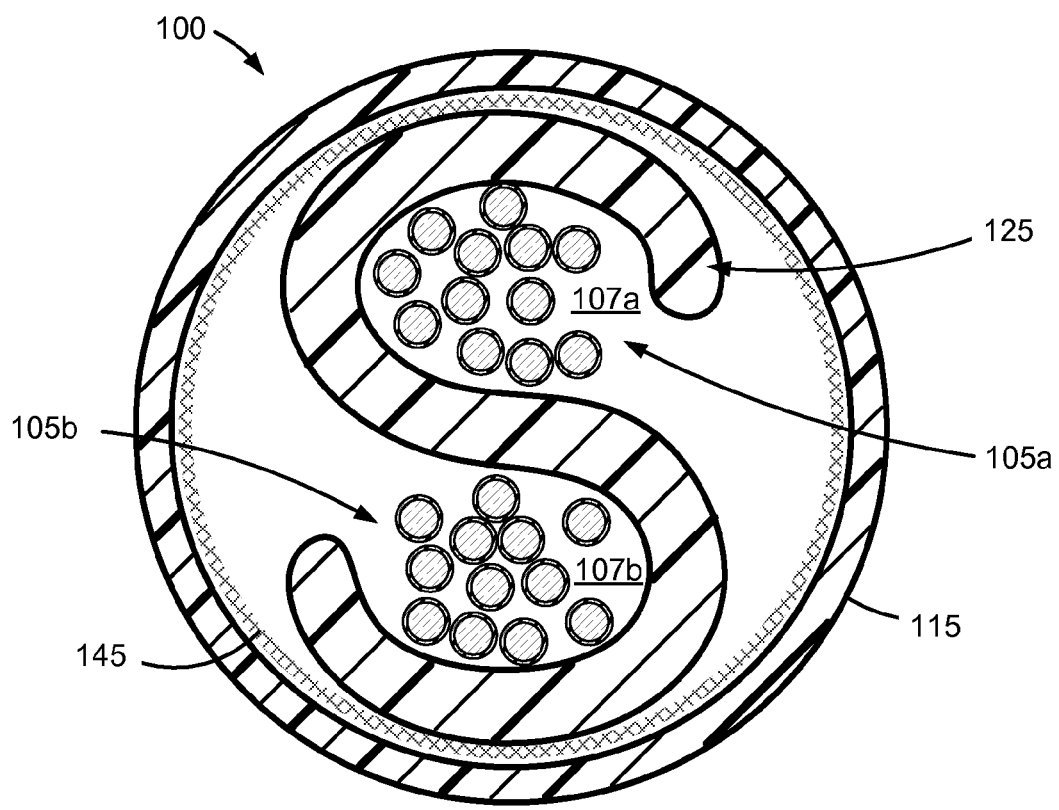
FIG. 1A is a cross sectional illustration of an exemplary fiber optic cable incorporating technology for distinguishing between bundles of optical fibers in accordance with certain embodiments of the present invention.

Many aspects of the invention can be better understood with reference to the above drawings. The elements and features shown in the drawings are not to scale, emphasis instead being placed upon clearly illustrating the principles of exemplary embodiments of the present invention. Moreover, certain dimensions may be exaggerated to help convey such principles visually. In the drawings, reference numerals designate like or corresponding, but not necessarily identical, elements throughout the several views.

DETAILED DESCRIPTION OF EXEMPLARY EMBODIMENTS

In accordance with certain exemplary embodiments of the present invention, a fiber optic cable can comprise two bundles of color-coded optical fibers or more than two bundles of optical fibers. One of skill in the art having benefit of this disclosure will appreciate that embodiments disclosed herein support more than two bundles and will further appreciate that the present disclosure teaches multiple cable embodiments that each comprises three, four, five, six, seven, eight, nine, ten, twenty, thirty, forty, etc. bundles of optical fibers. The optical fibers of the first bundle can have different colors, such that each of those fibers can be visually distinguished from one another. The optical fibers of the second bundle can have different colors, such that each of those fibers can be visually distinguished from one another. Each optical fiber in the first bundle can have a counterpart in the second bundle that has a common coloring. That is, each optical fiber in the first bundle can have a like colored, visually indistinguishable, optical fiber in the second bundle. The cable can comprise a separator that separates the two bundles, each in a different compartment. The two compartments can be color coded, to facilitate visually distinguishing the bundles, and thus the fibers, from one another. For example, the walls of the compartments can be colored differently, the separator can have one side colored different than the other side, and/or colored yarn or another visually distinguishable elongated item can be added to or integrated with one or both bundles or compartments.

The exterior jacket of the fiber optic cable can appear similar to conventional interconnect cables available on the market. In certain embodiments, the jacket is made from a low-smoke flame retardant material, for example polyvinyl chloride ("PVC"). The separator within the fiber optic cable can comprise a thin, formed barrier. The separator can likewise be made by extruding a low-smoke flame retardant material. In certain embodiments, the separator can comprise non-woven or woven textile or plastic tape or tapes.

Depending on the number of fiber bundles within the cable, the shape of the separator can vary. For cables with 24 fibers, the shape can be S-like, in order to create two opposing spaces for the fibers within the cable. In certain embodiments, the separator can be pinwheel shaped and may accommodate for than 24 fibers.

In certain embodiments the cable can comprise self-identifying groups. In a set of 12 optical fibers, the fibers can be grouped in four compartments, as such: first 4 fibers of first set (blue, orange, green, brown) in first compartment; 8 fibers of first set (slate, white, red, black, yellow, violet, rose, aqua) in second compartment; first 8 fibers of second set (blue, orange, green, brown, slate, white, red, black) in third compartment; last 4 fibers of second set (yellow, violet, rose, aqua) in fourth compartment. Because of the colors (first 4, last 8; first 8, last 4) in the groupings of fiber, they are identifiable sans indicia.

The optical fibers can be wrapped in flame-retardant polyester or aramid yarns, or similar materials. The separator can incorporate indicia for differentiating between or among bundles within the fiber optic cable. In certain embodiments, the indicia can comprise color, print, or another means of differentiation for the optical fibers in each compartment. For example, the separator can be colored or printed on one side to distinguish the first bundle, and not printed or colored, or have a different color, on the other side. The separator may also be a coextruded shape within the cable jacket, made of the same or different material than the jacket. The free space in the inside of the fiber optic cable can be empty for free fiber movement or filled with an appropriate type of yarn or filler material.

In accordance with certain exemplary embodiments of the present invention, data center cabling can support 12- or 24-fiber array connectorization. Fiber optic cables of very small diameter can be manufactured with separated bundles of colored optical fibers, without necessarily tubing the bundles. In accordance with certain exemplary embodiments of the present invention, a fiber optic cable complies with the IEEE 100 Gps standard known as IEEE 802.3ba, released Jun. 17, 2010, covering 100 Gbs Ethernet.

In accordance with certain exemplary embodiments of the present invention, a fiber optic cable can support connectorization of 24-fiber multi-fiber push on ("MPO") style connectors, and can offer the added benefit of managing polarity via the connectors. The optical fibers of such a fiber optic cable can be loose rather than in ribbon form. In an exemplary tubing-free embodiment, a color-coded separator not only segregates two groups of twelve, but also enhances cable strength.

Figure 1B:
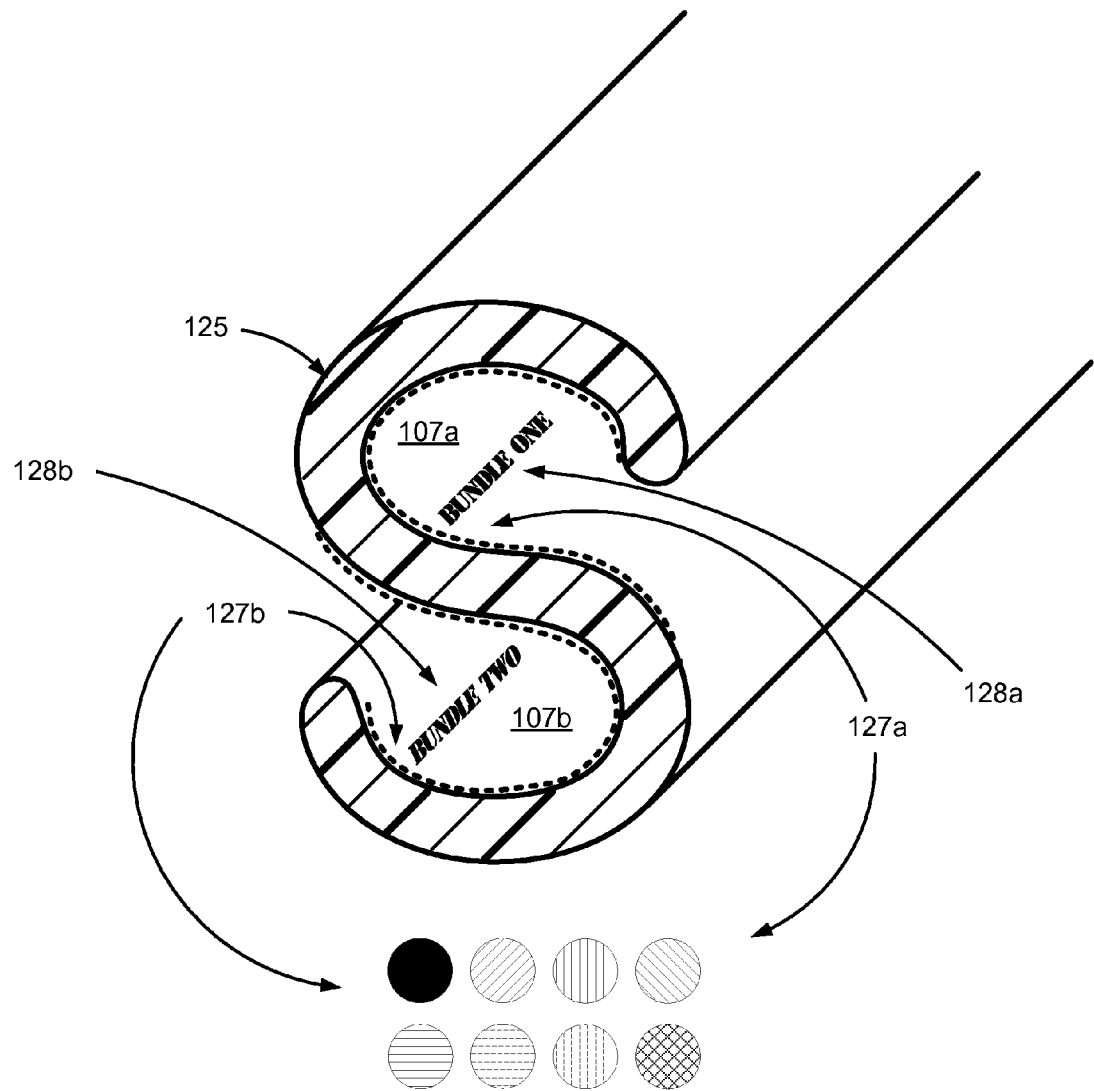
FIG. 1B is a cross sectional cutaway illustration of a component of an exemplary fiber optic cable incorporating technology for distinguishing between bundles of optical fibers in accordance with certain embodiments of the present invention.
Figure 1C:
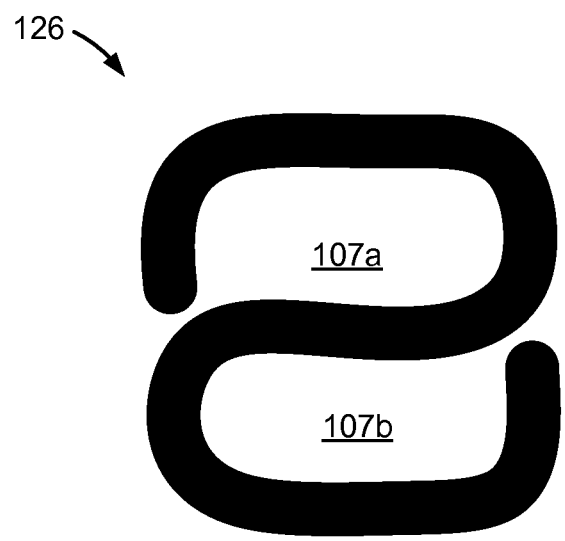
FIG. 1C is an illustration of a cross sectional shape of a component of an exemplary fiber optic cable incorporating technology for distinguishing between bundles of optical fibers in accordance with certain embodiments of the present invention.

Cabling technology will now be discussed more fully hereinafter with reference to FIGS. 1A-8, which illustrate representative embodiments of the present invention. FIGS. 1A, 1B, and 1C (collectively FIG. 1) describe certain embodiments in which an S-shaped member comprises indicia for distinguishing between two bundles of optical fibers. FIGS.

Figure 7A:
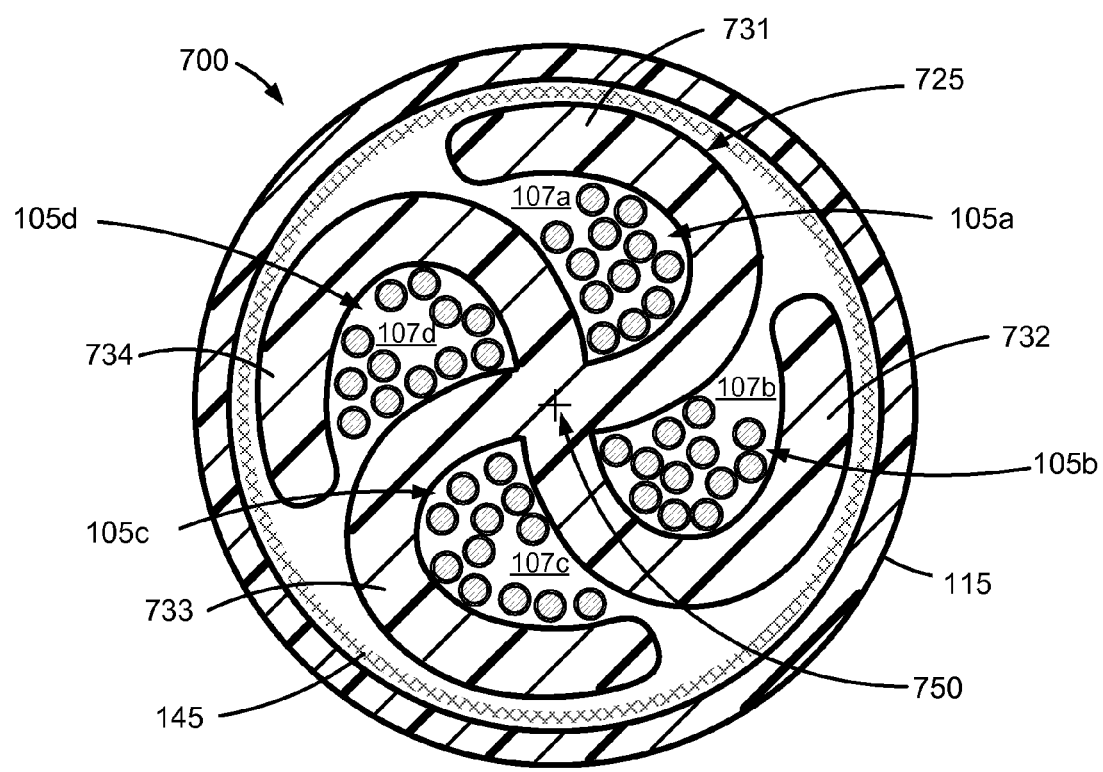
FIG. 7A is a cross sectional illustration of an exemplary fiber optic cable incorporating technology for distinguishing among bundles of optical fibers in accordance with certain embodiments of the present invention.
Figure 7B:
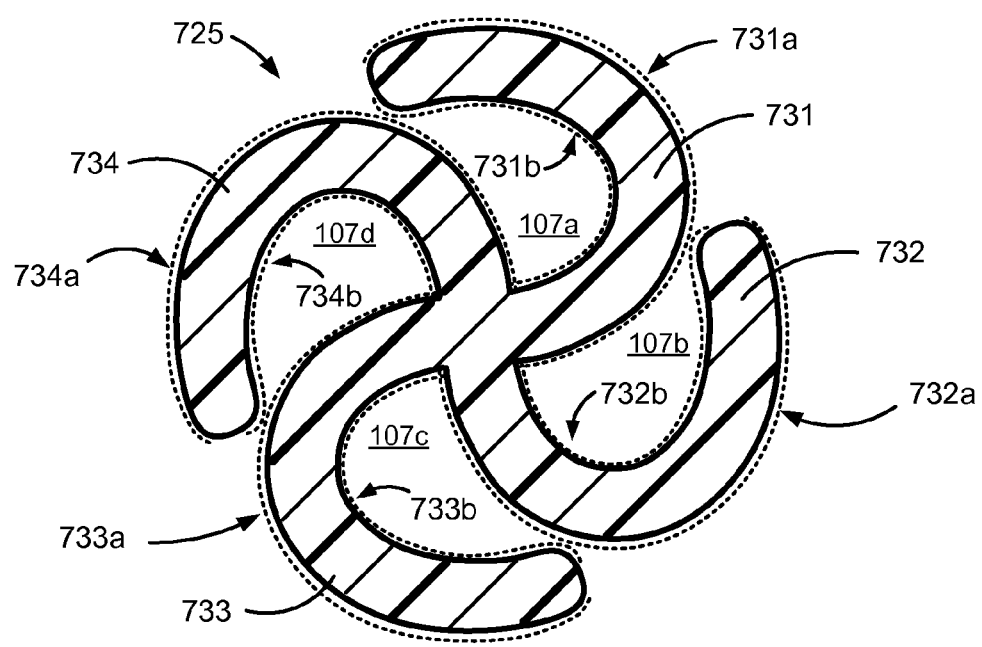
FIG. 7B is a cross sectional illustration of a component of an exemplary fiber optic cable incorporating technology for distinguishing among bundles of optical fibers in accordance with certain embodiments of the present invention.

2-6 describe a system and method for manufacturing the fiber optic cable that FIG. 1 illustrates. FIGS. 7A and 7B (collectively FIG. 7) and FIG. 8 describe embodiments in which a cross- or pinwheel-shaped member comprises four compartments and indicia for distinguishing among bundles of optical fibers.

The invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting, and among others supported by representations of the present invention.

Turning now to FIGS. 1A and 1B, FIG. 1A illustrates in cross section a fiber optic cable 100 incorporating technology for distinguishing between bundles of optical fibers 105 (105*a* and 105*b*). FIG. 1B illustrates a component of the fiber optic cable 100 in cross sectional cutaway according to certain exemplary embodiments of the present invention. In one exemplary embodiment, the fiber optic cable 100 can be characterized as an optical fiber non-conductive plenum ("OFNP") cable.

The jacket 115 of the fiber optic cable 100 forms an outer, cylindrical surface that provides environmental protection, including a moisture barrier, for the bundles of optical fibers 105. The jacket 115 can further impart the fiber optic cable 100 with strength and structural integrity. In the illustrated embodiment, the jacket 115 can be characterized as a sheath or a casing. In one exemplary embodiment, the jacket 115 has a wall thickness of approximately 0.65 millimeters ("mm")+/−0.005 mm. In one exemplary embodiment, the jacket 115 has an outer diameter of approximately 4.9 mm and an inner diameter of approximately 3.7 mm. However, the present technology is applicable to a wide variety of dimensions.

In certain exemplary embodiments, the jacket 115 is made from PVC with smoke and/or flame suppressing or retarding additives. The jacket 115 can have a polymer or polymeric composition, for example a fluoropolymer such as FEP, TFE, PTFE, PFA, etc.; or another polymer such as olefin, polyester, silicone, polypropylene, polyethylene, medium density polyethylene, or polyimide; or some other polymer or other material that provides acceptable strength, fire resistance, or abrasion and chemical properties as may be desirable for various applications. Certain exemplary embodiments comprise thermoplastic material while other embodiments can comprise thermosetting plastic.

Certain exemplary embodiments of the jacket 115 can be characterized as comprising polymeric material. The term "polymeric material," as used herein, generally refers to a material that comprises one or more polymers. Accordingly, a jacket of polymeric material can comprise one or more polymers and one or more additional, non-polymer materials.

Strength fibers 145 located under the jacket 115 extend lengthwise to enhance strength of the fiber optic cable 100. The strength fibers 145 may further provide a cushioning effect that mitigates contact between the bundles of optical fibers 105 and the jacket 145, thereby improving signal quality.

In certain embodiments, the strength fibers 145 comprise yarns, threads, or filaments of aramid material or another material that strengthens the fiber optic cable 100. In certain embodiments, the strength fibers 145 form a well defined ring when viewed in cross section as illustrated in FIG. 1A. Alternatively, the strength fibers 145 can be substantially dispersed throughout the interior of the fiber optic cable 100. In one exemplary embodiment, the strength fibers 145 are aramid yarns, 9×1420 denier.

In certain embodiments, the strength fibers 145 extend helically down the fiber optic cable 100. In certain applications, orienting the strength fibers 145 along the fiber optic cable's longitudinal axis, rather than helically wound, avoids the strength fibers 145 constricting the bundles of optical fibers 105 when the fiber optic cable 100 is strained.

In certain embodiments, the strength fibers 145 are waterswellable, for example water swellable yarn comprising particles of super absorbent material that cling to yarn filaments. The term "water-swellable yarn," as used herein, generally refers to a yarn that comprises a super absorbent polymer, with the term encompassing yarn in which super absorbent polymer clings to a yarn surface. Yarn may comprise one or more threads, filaments, cords, ropes, fibrous materials, fibers, strands, or similar structures that may include manmade or natural materials. In certain exemplary embodiments, the particles of super absorbent material cling without any adhesives, binders, cured materials, or wetted surfaces. The superabsorbent material chemically reacts with water, when present. However, in certain exemplary embodiments, the superabsorbent material is insoluble (or essentially insoluble) in water.

In one exemplary embodiment, the superabsorbent material comprises sodium polyacrylate powder. The term "super absorbent polymer" or "SAP," as used herein, generally refers to a material that can absorb or otherwise capture at least 50 times its weight in water (including without limitation liquid and vapor forms of water) or a liquid. Polyacrylonitrile starch graft polymer, saponified polyacrylonitrile starch graft polymer, polyacrylamide, and sodium polyacrylate are examples of SAP; however, this is not an exhaustive list. Typically, SAP swells or may assume a gelatinous state in the presence of water, thereby absorbing the water. SAP materials may have a granular or powder form, may be beads, or may have a variety of shapes. Many SAP materials can absorb 100 times their weight in water.

In certain exemplary embodiments, the strength fibers 145 are replaced by or augmented with a film or tape of fire resistant material, such as the materials sold by DuPont under the identifiers KAPTON and NOMEX.

In addition to strength fibers 145, the illustrated fiber optic cable 100 comprises a flexible member 125 that extends lengthwise along the axis of the cable 100. In the illustrated embodiment, the flexible member 125 is S-shaped when viewed in cross section. That is, the flexible member 125 has a form generally resembling the letter "S" when viewed in cross section.

The flexible member 125 provides two compartments 107 (107*a* and 107*b*), each containing one of the bundles of optical fibers 105. In various embodiments, the compartments 107 can comprise cavities, chambers, enclosures, slots, cells, pockets, nooks, and so forth, to mention a few representative examples without limitation.

The term "compartment," as used herein, generally refers to a space, region, or area that has been dedicated, sectioned off, or partitioned, separated, or divided with respect to a larger space, region, or area.

The flexible member 125 can be characterized as a separator, an organizer, a partition, a sectioning member, and/or a divider. In the illustrated embodiment, the flexible member 125 curls over, curls around, and extends partially around the bundle of optical fibers 105*a* and the bundle of optical fibers 105b. The flexible member 125 can be characterized as forming, producing, providing, defining, framing, and/or creating the compartments 107.

As shown in FIG. 1B, the flexible member 125 comprises two surfaces 127a and 127b. The surface 127a faces and adjoins the compartment 107a and the bundle of optical fibers 105a that is in that compartment 107a. The surface 127b faces and adjoins the compartment 107b and the bundle of optical fibers 105b that is in that compartment 107b.

At least one of the surfaces 127a and 127b comprises indicia for distinguishing the compartments 107a and 107b and the associated bundles of optical fibers 107a and 107b. In the illustrated embodiment, the indicia comprises different colors. For example, the surface 127a can be violet, while the surface 127b can be black. In various embodiments, the different colors can be violet, purple, blue, green, yellow, gold, pink, red, black, white, gray, or silver, to mention a few representative possibilities without limitation. In certain embodiments, one of the surfaces 127a and 127b is colored while the other surface 127a and 127b is the color of the base material of the flexible member 125. In certain embodiments, the indicia comprises a distinguishing pattern of colors, for example a blue background with red stripes. In various embodiments, the indicia can comprise symbols, markings, signs, letters, numbers, digits, words, writings, alphanumeric symbols, codes, coatings, stripes, patterns, dyes, inks, prints, messages, or some other appropriate means for distinguishing the bundles of optical fibers 105a and 105b from one another. FIG. 1B illustrates one representative example where the words "BUNDLE ONE" 128a AND "BUNDLE TWO" 128b are respectively printed on the surfaces 127a and 127b as distinguishing markings.

In certain embodiments, each bundle of optical fibers 105 uses a common color coding scheme to support visual fiber-to-fiber differentiation within a single bundle 105. With such a color coding scenario, the bundles 105 can be visually indistinguishable yet differentiated by the indicia on one or more of the surfaces 127a and 127b.

In certain embodiments, the bundles of optical fibers 105 are disposed randomly and loosely in the compartments 107. In certain embodiments, each bundle of optical fibers 105 is organized, for example in one or more linear arrays or "ribbons." In certain embodiments, each bundle of optical fibers 105 comprises multiple ribbons of optical fibers 105 stacked on top of one another.

The illustrated number of optical fibers in each bundle of optical fibers 105 and the illustrated configuration are intended to be exemplary rather than limiting. The optical fibers may be bound to one another in units of twelve, or may alternatively be loose and relatively unstructured.

The bundles of optical fiber 105 can be single mode fiber or some other optical waveguide that carries communications data. In various exemplary embodiments, the bundles of optical fibers 105 can be single mode or multimode and can have a composition based on glass, glassy, or silica material. Alternatively, the bundles of optical fibers 105 can incorporate plastic material as an optical transmission medium.

While the illustrated cable embodiment can be characterized as buffer tube free, other embodiments, may incorporate buffer tubes. The term "buffer tube," as used herein, generally refers to a tube within a cable for containing one or more optical fibers and for providing such optical fibers annular space for lateral movement. When a fiber optic cable is bent, optical fibers in a buffer tube of the cable may shift toward one side of the buffer tube, for example.

In certain exemplary embodiments, the flexible member 125 is made from PVC with smoke and/or flame suppressing or retarding additives. The flexible member 125 can have a polymer or polymeric composition, for example a fluoropolymer such as FEP, TFE, PTFE, PFA, etc.; or another polymer such as olefin, polyester, silicone, polypropylene, polyethylene, medium density polyethylene, or polyimide; or some other polymer or other material that provides acceptable strength, fire resistance, or abrasion and chemical properties as may be desirable for various applications. Certain exemplary embodiments comprise thermoplastic material while other embodiments can comprise thermosetting plastic.

In certain exemplary embodiments, the flexible member 125 comprises an inorganic material, such as glass fiber. In certain exemplary embodiments, the flexible member 125 comprises an organic material. In certain exemplary embodiments, the flexible member 125 comprises a polymeric material. In certain exemplary embodiments, the flexible member 125 comprises aramid fibers. In certain exemplary embodiments, the flexible member 125 comprises natural fiber, such as cotton, wool, animal fiber, sisal, hemp, or plant fiber, to mention a few representative examples.

Turning now to FIG. 1C, this figure illustrates a cross sectional shape of a component of a fiber optic cable incorporating technology for distinguishing between bundles of optical fibers according to certain exemplary embodiments of the present invention. More specifically, FIG. 1C illustrates a cross sectional shape for a flexible member 126 that provides an alternative geometric form relative to the flexible member 125 illustrated in FIGS. 1A and 1B and discussed above.

The flexible member 126, which typically incorporates bundle distinguishing technology as discussed above, is S-shaped. In this embodiment, the top and the bottom of the "S" are relatively flat so that they may deviate in form from the interior surface of the jacket 115 (see FIG. 1). The outer profile of the flexible member 126 can be viewed as square with rounded corners.

Figure 2:
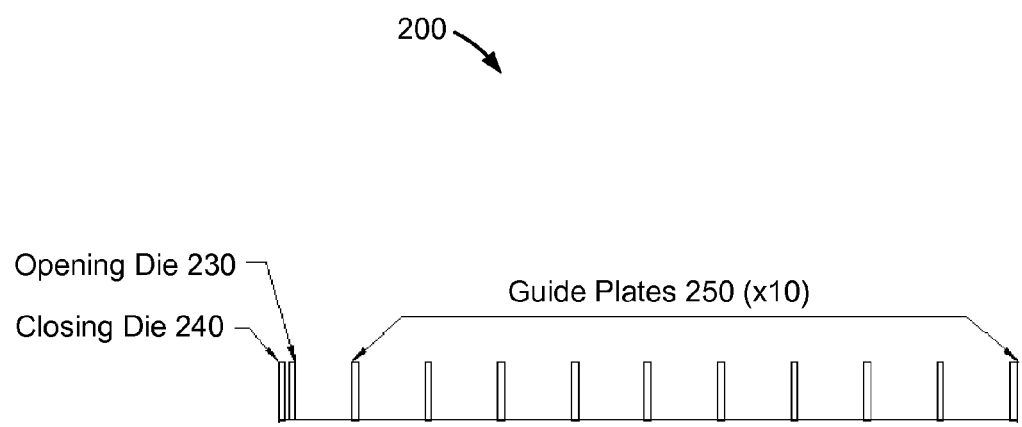
FIG. 2 is an illustration of an exemplary system for making a fiber optic cable that incorporates technology for distinguishing bundles of optical fibers in accordance with certain embodiments of the present invention.
Figures 3A, 3B:
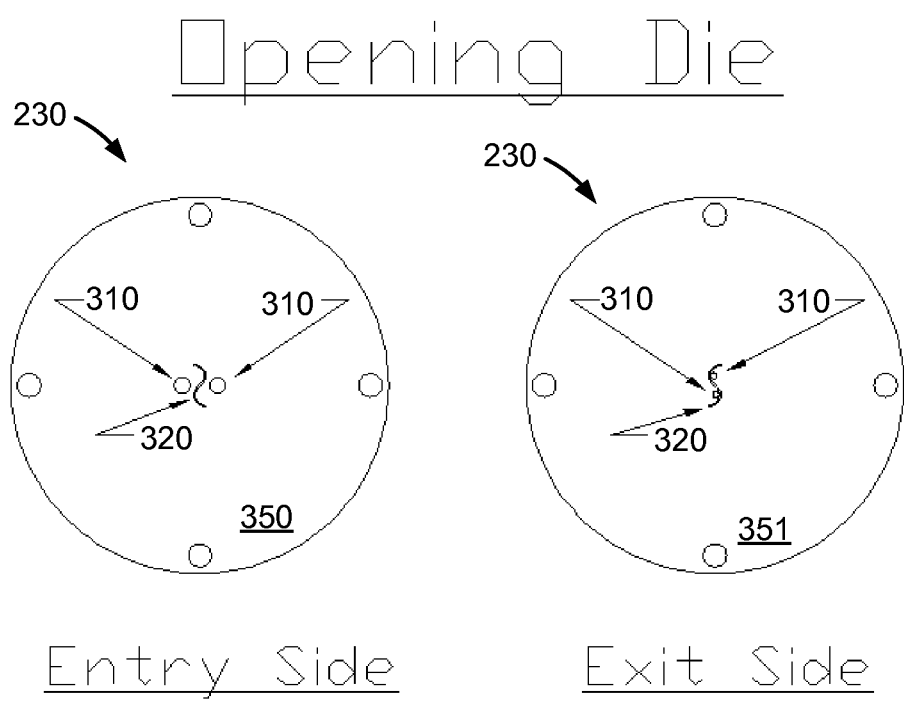
FIGS. 3A and 3B (collectively FIG. 3) are illustrations of an exemplary opening die of a system for making a fiber optic cable that incorporates technology for distinguishing bundles of optical fibers in accordance with certain embodiments of the present invention.
Figure 4A:
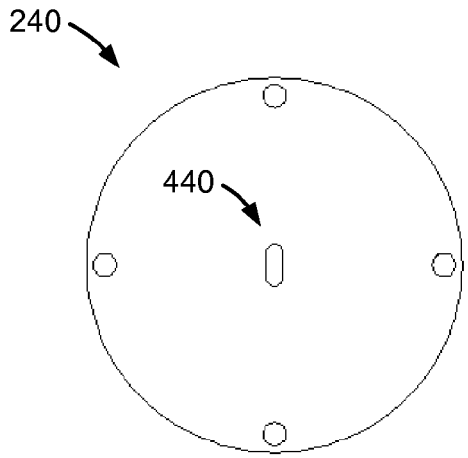
FIG. 4A is an illustration of an exemplary closing die of a system for making a fiber optic cable that incorporates technology for distinguishing bundles of optical fibers in accordance with certain embodiments of the present invention.
Figure 4B:
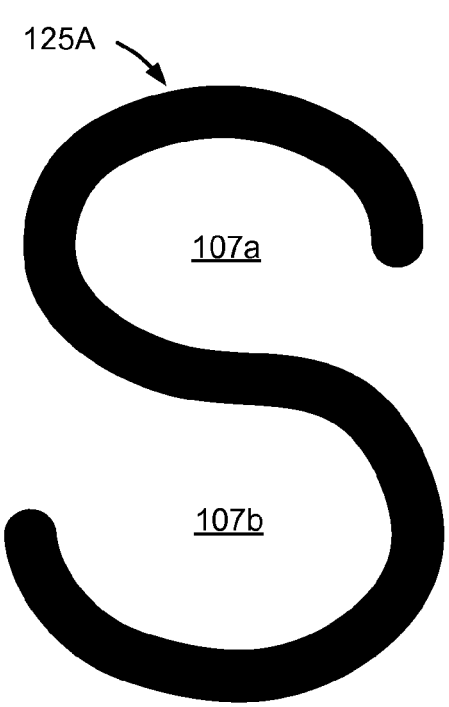
FIG. 4B is an illustration of a cross sectional shape of a component of an exemplary fiber optic cable incorporating technology for distinguishing between bundles of optical fibers, wherein the component is closed in a relaxed state in connection with cable fabrication, in accordance with certain embodiments of the present invention.
Figure 4C:
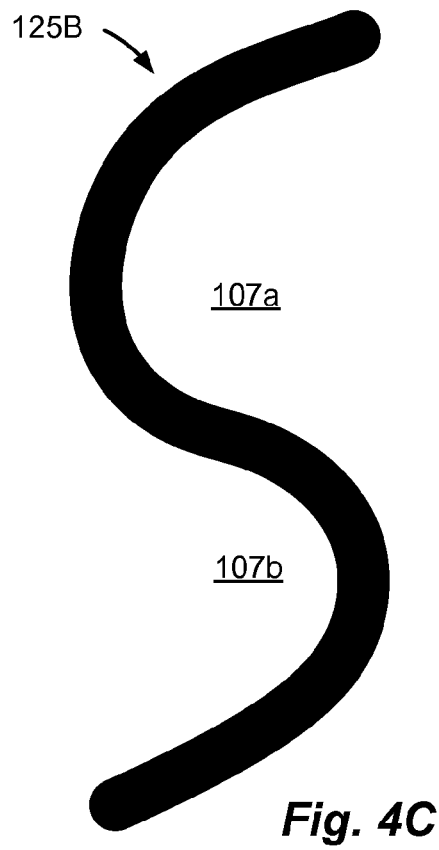
FIG. 4C is an illustration of a cross sectional shape of a component of an exemplary fiber optic cable incorporating technology for distinguishing between bundles of optical fibers, wherein the component is open in a stressed state in connection with cable fabrication, in accordance with certain embodiments of the present invention.
Figure 5:
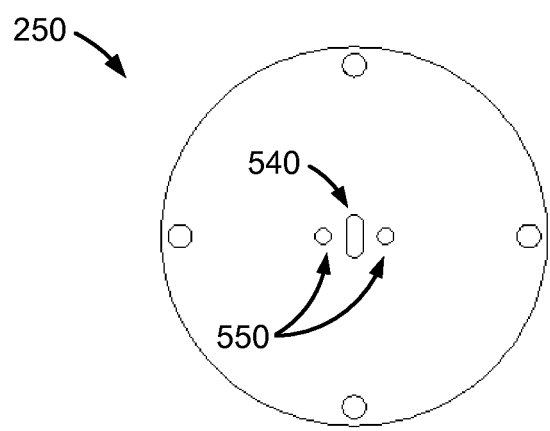
FIG. 5 is an illustration of an exemplary guide plate of a system for making a fiber optic cable that incorporates technology for distinguishing bundles of optical fibers in accordance with certain embodiments of the present invention.

Turning now to FIGS. 2, 3, 4, and 5, these figures describe exemplary tooling for fabricating an embodiment of the fiber optic cable 100 as illustrated in FIG. 1 and discussed above. FIG. 2 illustrates an exemplary system 200 for making a fiber optic cable that incorporates technology for distinguishing bundles of optical fibers according to certain exemplary embodiments of the present invention. FIGS. 3, 4A, and 5 respectively illustrate an opening die 230, a closing die 240, and a guide plate 250 of the system 100 according to certain exemplary embodiments of the present invention. FIGS. 4B and 4C respectively illustrate cross sectional profiles of the flexible member 125 closed in a relaxed state 125A and open in a stressed state 125B in connection with cable fabrication according to certain exemplary embodiments of the present invention.

Referring to FIG. 2, the two bundles of optical fibers 105a and 105b and the flexible member 125 feed into the system 200 from the right as separate elements, are integrated as they flow though the system 200, and emerge on the left as an integrated unit. In certain embodiments, the bundles of optical fibers 105a and 105b and the flexible member 125 may feed in the opposite direction. That is the bundles of optical fibers 105a and 105b and the flexible member 125 can enter from the left and exit on the right.

As illustrated in FIG. 5, each guide plate 250 comprises a center hole 540 through which the flexible member 125 passes and two lateral holes 550, one for the bundle of optical fibers 105a, and one for the bundle of optical fibers 105b. In certain embodiments, the center hole 540 is oval or oblong, while in other embodiments, the center hole 540 can be square with rounded corners or substantially circular. As discussed in further detail below, the guide plates 250 can rotate in connection with creating twist or providing excess fiber length.

As illustrated in FIG. 3, the opening die 230 has an entry side 350 facing the guide plates 250 (upstream) and an exit side 351 facing the closing die 240 (downstream). From the entry side 350, the flexible member 125 passes through the hole 320 that has a shape substantially matching the flexible member 125, in this case S-shaped.

While S-shaped, relative to the flexible member 125, the shape of the hole 320 of the opening die 230 is stretched or somewhat flattened. That is, the S shape has been opened to facilitate placement of the bundles of optical fibers 105*a* and 105*b* into the compartments 107*a* and 107*b*. Prior to entering the hole 320, the flexible member 125 is in a relaxed state 125A as illustrated in FIG. 4B. The hole 320 applies forces to the flexible member 125 to place the flexible member 125 in an open or stressed state 125B as illustrated in FIG. 4C. Thus, the hole 320 can be viewed as spreading, distorting, reconfiguring, or reorienting the flexible member 125. When the flexible member exits the hole 320, the flexible member 125 springs back to the relaxed state 125, and the compartments 107*a* and 107*b* close.

The hole 320 is enlarged relative to the flexible member 125 to facilitate transmission of the S-shaped member while maintaining the flexible member 125 in a specified orientation. Thus, the flexible member 125 has a level of play within the hole 320 to avoid binding.

Each of the bundles of optical fibers 105*a* and 105*b* passes through one of the holes 310. The holes 310 move the flowing bundles of optical fibers 105*a* and 105*b* into the respective compartments 107*a* and 107*b* of the flexible member 125 to provide the general configuration illustrated in FIG. 1A and discussed above. To move the bundles of optical fibers 105*a* and 105*b* into position, the axis of each of the holes 320 is tilted relative to the flat surface or face of the opening die 230. The tilting hole axes translate the flowing bundles of optical fibers 105*a* and 105*b* into their respective compartments 107*a* and 107*b*. The holes 310 also neck down to facilitate bundle translation and to avoid bundle damage. That is, each of the holes 310 has a larger diameter on the entry side 350 of the opening die 230 than on the closing side 351 of the opening die 230.

As the flexible member 125 and bundles of optical fibers 105*a* and 105*b* exit the opening die 230, the flexible member 125 springs back from the flattened state caused by the elongate form of the hole 320 and returns to a relaxed state as shown in FIGS. 1A and 1B and in FIG. 4B. Accordingly, the flexible member 125 embraces, captures, and retains the bundles of optical fibers 105*a* and 105*b*. As illustrated in FIG. 4A, the closing die 240 has a single hole 440 through which the integrated unit of the flexible member 125 and the two bundles of optical fibers 105*a* and 105*b* passes.

As discussed further below, in certain exemplary embodiments, twisting motion of tooling within the system 200 produces a helical oscillation of that integrated unit.

The strength fibers 145 are disposed around that integrated unit, which can be characterized as a cable core, and the jacket 115 is extruded applied over the result to form the fiber optic cable 100 as illustrated in FIG. 1 and discussed above.

Figure 6:
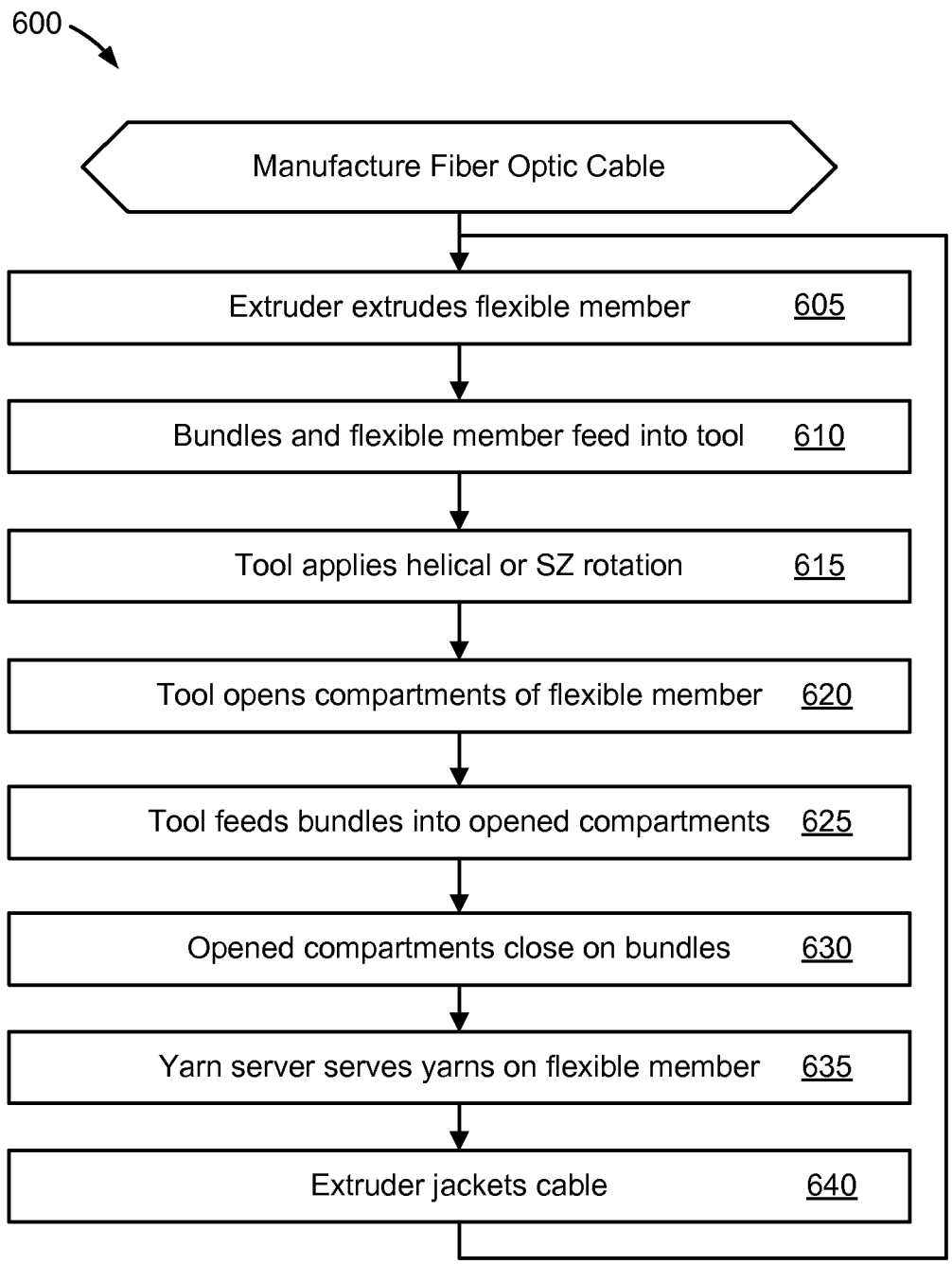
FIG. 6 is a flowchart for an exemplary process for making a fiber optic cable that incorporates technology for distinguishing bundles of optical fibers in accordance with certain embodiments of the present invention.

Turning now to FIG. 6, this figure illustrates a flowchart for a process 600 for making a fiber optic cable 100 that incorporates technology for distinguishing bundles of optical fibers 105 according to certain exemplary embodiments of the present invention. FIG. 6 will be discussed with exemplary reference to the foregoing figures and embodiments, without limitation.

At step 605 of process 600, which is entitled Manufacture Fiber Optic Cable, an extruder forms the flexible member 605, typically in a continuous process. In certain embodiments, bundle distinguishing colors can be applied to the flexible member 605 after the flexible member 605 exits the extruder, or alternatively by applying a layer of colored thermoplastic within the extruder tip.

At step 610 of process 600, the flexible member 125 and the bundles of optical fibers 105*a* and 105*b* flow or feed into a tool, such as the system 200 illustrated in FIG. 2 and discussed above. In certain embodiments, bundle distinguishing colors or writing is applied to the flexible member 125 before, at, or after entry in the tool. In certain exemplary embodiments, fiber tension is between about 50 and 300 grams, with payoff tension in a range of 100 to 5000 grams, for example.

At step 615, the tool applies rotation to create excess fiber length and/or to mitigate fiber stress in the finished fiber optic cable 100.

In certain exemplary embodiments, each guide plate 250 (which is a type of tool in and of itself) rotates based on machine settings entered for overall twist lay and number of turns. The guide plates 250 can rotate individually but in synchronization. The rotation can comprise "SZ" oscillation, whereby fibers coil helically clockwise for a specified cable length, counterclockwise for another specified cable length, clockwise for another specified cable length, and so forth. Typical lay length can be in a range of 400 millimeters (mm) to 1600 mm, with the number of turns in a range of 1 to 10 for example.

In certain exemplary embodiments, helical rotation of the bundles of optical fibers 105*a* and 105*b* and the flexible member 125 is substantially constant along the cable length. Typical lay length can be in a range of 400 to 1600 mm, for example.

In certain exemplary embodiments, the tool operates without applying any intended rotation or oscillation to the bundles of optical fibers 105*a* and 105*b* and the flexible member 125.

At step 620, the tool opens the compartments 107*a* and 107*b* of the flexible member 125. As discussed above with reference to FIGS. 3A, 3B, 4A, 4B, and 4C the opening die 230, which is a tool in and of itself, can receive the flexible member 125 in a closed or relaxed state 125A and apply forces to the flexible member 125 to distort the flexible member 125 into an open or stressed state 125C. Accordingly, the compartments 107*a* and 107*b* are open and configured for receiving the bundles of optical fibers 105*a* and 105*b*.

At step 625, the tool feeds the bundles of optical fibers 105*a* and 105*b* into the opened compartments 107*a* and 107*b*. As discussed above, the opening die 230 can comprise holes 310 that are oriented for translating the bundles of optical fibers 105*a* and 105*b* into the opened compartments 107*a* and 107*b*.

At step 630, the flexible member 125 and the bundles of optical fibers 105*a* and 105*b* exit the opening die 230 and are received by the closing die 240, passing through the hole 440. Accordingly, the stress and force applied by the opening die 230 are relieved, reduced, and/or eliminated. In response, the flexible member 125 springs back to the closed or relaxed state 125B as illustrated in FIG. 4B, and the compartments 107*a* and 107*b* close on the bundles of optical fibers 105*a* and 105*b*. Accordingly, the flexible member 125 captures the bundles of optical fibers 105*a* and 105*b*, providing a cable core as illustrated in FIG. 1A.

At step 635, a yarn server serves yarns around the flexible member 125 and the captured bundles of optical fibers 105*a* and 105*b*. In an exemplary embodiment, two to eighteen yarns are applied with a tension range of 100 to 300 grams, for example. Lay length can be in a range of 100 to 400 mm, for example. Helically, counter-helically, or longitudinally served yarns can be utilized.

At step 640, the jacket 115 is extruded over the yarns to form the finished fiber optic cable 100, as illustrated in FIG. 1.

Since in certain embodiments, the flexible member 125 may be made of a material that melts at the same or lower temperature of the extruder head, techniques can be employed to prevent breakout upon startup of jacket extrusion. In certain exemplary embodiments, startup of jacketing extrusion proceeds with an aramid tie that secures the bundles of optical fibers 105 and the flexible member 125 to one another and to a start line. The core of the cable to be manufactured can be tied to a pull cord or previously made cable's tail, to facilitate rapid run set up. Due to a potential low melt temperature of the flexible member 125, the aramid yarns can be fed through the extrusion crosshead and tied onto the pull rope or cable beyond the extruder crosshead. The bundles of optical fibers 105 and the flexible member 125 can then be secured to the aramid yarns via tape, glue or other attachment mechanism. The extruder can then be started and the take up activated. This technique can help avoid breaks of the flexible member 125 during jacket extrusion.

Process 100 can iterate from step 640 to step 605 or 610 for continuous or semi-continuous process flow, for example.

Turning now to FIG. 7, FIG. 7A illustrates in cross section a fiber optic cable 700 incorporating technology for distinguishing among bundles of optical fibers 105 (105*a*, 105*b*, 105*c*, and 105*d*), and FIG. 7B illustrates a component of the fiber optic cable 700 in cross section according to certain exemplary embodiments of the present invention. In the illustrated embodiment, that component is a flexible member 735 that extends lengthwise along a longitudinal axis 750 of the fiber optic cable 700.

In the embodiment of FIG. 7, the illustrated flexible member 735 comprises four fins 731, 732, 733, 734 that form four compartments 107*a*, 107*b*, 107*c*, 107*d* for four bundles of optical fibers 105*a*, 105*b*, 105*c*, 105*d*. Various forms of the flexible member 735 can comprise fewer or more fins. For example, certain embodiments can comprise two, three, five, six, seven, eight, nine, ten, or more than ten fins. In one exemplary embodiment, each of the fins 731, 732, 733, 734 has a thickness in a range of about 0.35 mm to about 0.6 mm, for example 0.52 mm. The flexible member 735 provides one example of a pinwheel shaped cross section.

The term "fin," as used herein, generally refers to an elongate strip or ribbon of material having one edge running or extending along a surface of a substrate or member or base and another edge raised with respect to or projecting from the surface; and, as used herein, the term "fin" is broad enough to cover an element or feature resembling a fin of a fish, a thin projection or ridge that extends lengthwise, and a feature that resembles a fin of a heat sink.

Various embodiments of the fiber optic cable 700 can have fewer or more compartments 107 than the illustrated number and/or few or more bundles of optical fibers 105 than the illustrated number. For example, certain embodiments can comprise two, three, five, six, seven, eight, nine, ten, or more than ten bundles of optical fibers 105. Certain embodiments can comprise two, three, five, six, seven, eight, nine, ten, or more than ten compartments 107.

As illustrated, the fiber optic cable 700 has a common number of compartments 107, bundles of optical fibers 105, and fins 731, 732, 733, 734. However, many other configurations are supported.

Certain embodiments of the fiber optic cable 700 have more fins 731, 732, 733, 734 than bundles of optical fibers 105. Certain embodiments of the fiber optic cable 700 have more bundles of optical fibers 105 than fins 731, 732, 733, 734.

Certain embodiments of the fiber optic cable 700 have more fins 731, 732, 733, 734 than compartments 107. Certain embodiments of the fiber optic cable 700 have more compartments 107 than fins 731, 732, 733, 734.

Certain embodiments of the fiber optic cable 700 have more compartments 107 than bundles of optical fibers 105. Certain embodiments of the fiber optic cable 700 have more bundles of optical fibers 105 than compartments 107.

In the illustrated embodiment, each fin 731, 732, 733, 734 curls to extend laterally or circumferentially over, forming a respective compartment 107*a*, 107*b*, 107*c*, 107*d*, each of which houses a respective bundle of optical fibers 105*a*, 105*b*, 105*c*, 105*d*. As discussed above, the bundles of optical fibers 105*a*, 105*b*, 105*c*, 105*d* can be visually indistinguishable from one another. Further, the compartments 107*a*, 107*b*, 107*c*, 107*d* can have indistinguishable sizes and shapes. Accordingly, in an exemplary embodiment, a person looking at the fiber optic cable 725 with unaided eye may find the bundles of optical fibers 105*a*, 105*b*, 105*c*, 105*d* indistinguishable based on size and shape of the flexible member 725 and based on the bundles 105*a*, 105*b*, 105*c*, 105*d* themselves. As discussed in further detail below, the flexible member 725 comprises indicia distinguishing the bundles of optical fibers 105*a*, 105*b*, 105*c*, 105*d*.

The fin 731 provides the compartment 107*a* for the bundle of optical fibers 105*a*. The fin 732 provides the compartment 107*b* for the bundle of optical fibers 105*b*. The fin 733 provides the compartment 107*c* for the bundle of optical fibers 105*c*. The fin 734 provides the compartment 107*d* for the bundle of optical fibers 105*d*.

The flexible member 725 comprises indicia distinguishing at least one of the bundles of optical fibers 105 from another one of the bundles of optical fibers 105. In certain embodiments, the flexible member 725 can comprise indicia distinguishing the bundle of optical fibers 105*a* from the bundle of optical fibers 105*b* without distinguishing other bundles of optical fibers 105*c*, 105*d*. In certain embodiments, the flexible member 725 comprises indicia distinguishes all of the bundles of optical fibers 105*a*, 105*b*, 105*c*, 105*d* from one another.

In certain exemplary embodiments, the indicia comprises different colors applied to the surfaces 731*a*, 731*b*, 732*a*, 732*b*, 733*a*, 733*b*, 734*a*, 734*b*. In certain embodiments, each of those surfaces 731*a*, 731*b*, 732*a*, 732*b*, 733*a*, 733*b*, 734*a*, 734*b* has a different color. In one exemplary embodiments, the surfaces 731*b* and 734*a* are blue, the surfaces 731*a* and 732*b* are red, the surfaces 732*a* and 733*b* are green, and the surfaces 733*a* and 734*b* are orange.

In various embodiments, indicia on one or more of the surfaces 731*a*, 731*b*, 732*a*, 732*b*, 733*a*, 733*b*, 734*a*, 734*b* comprises one or more symbols, markings, signs, letters, numbers, digits, words, writings, alphanumeric symbols, codes, coatings, stripes, patterns, dyes, inks, prints, or messages. Accordingly, a person can visually distinguish otherwise indistinguishable bundles of optical fibers 105.

In certain embodiments, the fins 731 and 733 are substantially thicker than the fins 732 and 734. In such embodiments, the compartment 107*a* may house eight optical fibers, the compartment 107*b* may house four optical fibers, the compartment 107*c* may house four optical fibers, and the compartment 107*d* may house eight optical fibers, for example.

In certain embodiments, the fins 732 and 734 can be notched at the base to facilitate technician breakaway. In this manner a technician can readily remove a terminal section of the fins 732 and 734 to consolidate the four groups of fibers into two groups for connectorization. In certain embodiment, the fins 732 and 734 can comprise perforations that aid removal of distal fin sections during field connectorization.

In certain embodiments, the flexible member 725 comprises a stabilizing element, such as a yarn, glass reinforced plastic strength member, optical fiber, or copper wire, that extends lengthwise along the central axis of the flexible member 725. Such an element can provide structural support and/or carry signals.

In certain embodiments, each fin 731, 732, 733, 734 extends radially and then has two circumferential projections, one extending clockwise and one extending counter clockwise. The projections of adjacent fins may overlap, be separated by a gap, or abut and touch one another. Such overlaps or gaps can facilitate opening and closing the compartments.

As discussed above with reference to the fiber optic cable 100 illustrated in FIG. 1, the fiber optic cable 700 can comprise strength fibers 145 and a jacket 115. In one exemplary embodiment, the jacket 115 of the fiber optic cable 700 has an outer diameter of about 6.0 mm and an inner diameter of about 4.7 mm. In one exemplary embodiment, the jacket 115 of the fiber optic cable 700 has a wall thickness of about 0.65 mm.

Figure 8:
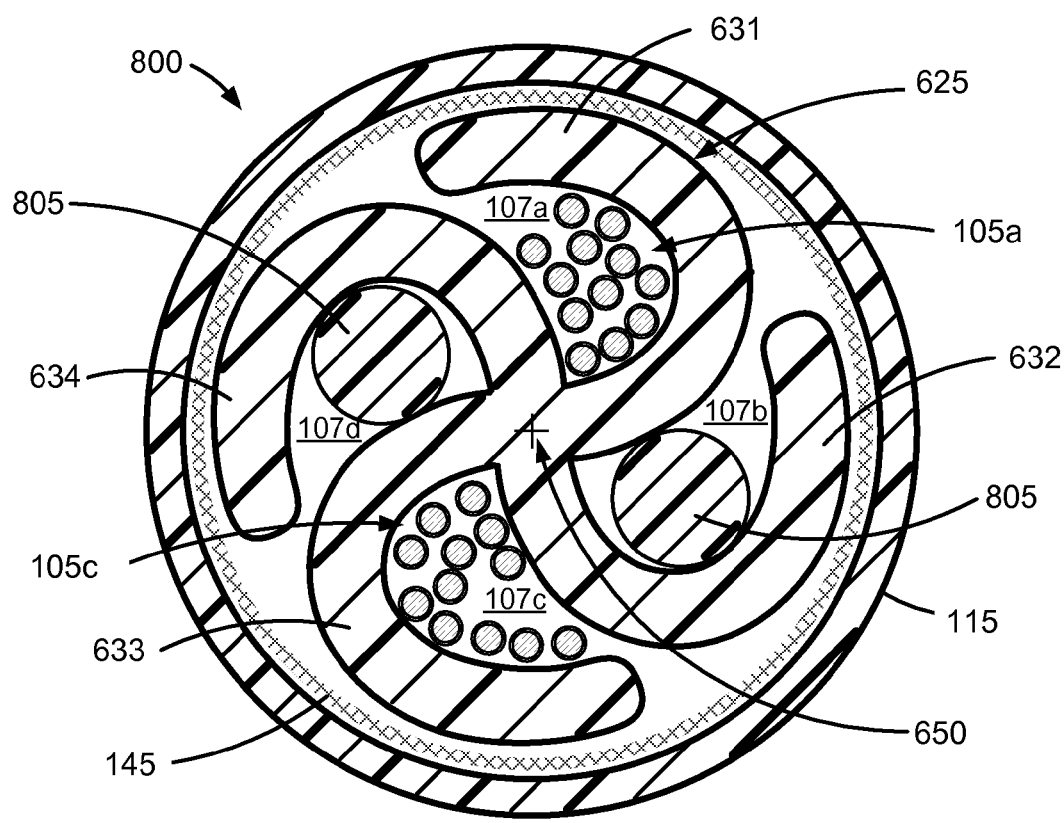
FIG. 8 is a cross sectional illustration of an exemplary fiber optic cable incorporating technology for distinguishing among bundles of optical fibers in accordance with certain embodiments of the present invention.

Turning now to FIG. 8, this figure illustrates in cross section a fiber optic cable 800 incorporating technology for distinguishing among bundles of optical fibers according to certain exemplary embodiments of the present invention. As compared to the embodiment illustrated in FIGS. 7A and 7B and discussed above, the fiber optic cable 800 of FIG. 8 comprises two strength members 805, one in the compartment 107b and another in the compartment 107d. In certain embodiments, the fiber optic cable 800 further comprises bundle distinguishing technology, such as embodiments of the indicia disclosed above. The strength members 805 can mitigate stress on the bundles of optical fibers 105a and 105b.

In certain embodiments, the strength members 805 comprise glass reinforced plastic members or rods or rigid strength members. In certain embodiments, the strength members comprise aramid fibers or yarns.

Technology has been described for distinguishing between or among bundles of optical fibers within a fiber optic cable. From the description, it will be appreciated that an embodiment of the present invention overcomes the limitations of the prior art. Those skilled in the art will appreciate that the present invention is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

What is claimed is:

1. A fiber optic cable comprising:
    an outer jacket defining an interior space; and
    a member disposed lengthwise in the interior space and comprising four radial projections that section the interior space into at least four compartments, each housing a respective group of color-coded optical fibers,
    wherein, with the member in a relaxed state, a first radial projection extends towards a second radial projection, the second radial projection extends towards a third radial projection, the third radial projection extends towards a fourth radial projection, and the fourth radial projection extends towards the first radial projection,
    wherein each radial projection exhibits a natural spring back force that pulls it towards another radial projection, and
    wherein the member comprises a plurality of surfaces having different indicia that distinguish the groups from one another.

2. The fiber optic cable of claim 1, wherein the compartments are of like size and shape.

3. The fiber optic cable of claim 1, wherein each respective group of color-coded optical fibers comprises at least 12 optical fibers.

4. The fiber optic cable of claim 1, wherein the groups of color-coded optical fibers are visibly indistinguishable from one another.

5. The fiber optic cable of claim 1, wherein the member has a pinwheel shaped cross section.

6. The fiber optic cable of claim 1, wherein the four radial projections comprise four fins radiating from a longitudinal axis of the fiber optic cable toward an interior surface of the outer jacket, and
    wherein at least two of the four fins comprises a respective surface comprising a different written message.

7. The fiber optic cable of claim 1, wherein, with the member in the relaxed state, each of the four radial projections extends radially outward from a longitudinal axis of the fiber optic cable and then curls circumferentially to form a respective one of the at least four compartments.

8. A fiber optic cable comprising:
    a jacket circumferentially disposed about an axis of the fiber optic cable;
    a flexible member disposed in an SZ configuration and extending longitudinally along the axis, the flexible member comprising a plurality of fins, each fin projecting radially with respect to the axis and towards another fin to define a corresponding plurality of compartments; and
    a plurality of bundles of color-coded optical fibers, each bundle disposed in a respective one of the compartments and comprising loosely arranged optical fibers,
    wherein a first fin in the plurality of fins comprises a first surface oriented toward a first one of the bundles and a second surface oriented toward a second one of the bundles, and
    wherein the first surface comprises indicia differentiating the first one of the bundles from the second one of the bundles.

9. The fiber optic cable of claim 8, wherein the indicia comprises a colored surface.

10. The fiber optic cable of claim 8, wherein the indicia comprises a first material bonded to the first surface,
    wherein the second surface comprises second indicia,
    wherein the second indicia comprises a second material bonded to the second surface, and
    wherein the first material and the second material have different colors.

11. The fiber optic cable of claim 8, wherein with the flexible member in a relaxed state, the first fin curls over the first one of the bundles, and
    wherein, but for the indicia, the first one of the bundles is visibly indistinguishable from the second one of the bundles.

12. The fiber optic cable of claim 8, wherein the plurality of fins comprises four fins, including the first fin,
    wherein the plurality of bundles comprises four bundles, including the first and second ones of the bundles, and
    wherein the flexible member further comprises second indicia distinguishing the second one of the four bundles, third indicia distinguishing a third one of the four bundles, and fourth indicia distinguishing a fourth one of the four bundles.

13. A fiber optic cable comprising:
a jacket circumferentially covering a member that comprises four radial fins that define four compartments,
   wherein two of the fins have a first thickness and the other two fins have a second thickness greater than the first thickness, and
a first bundle of optical fibers disposed in a first of the four compartments; and
a second bundle of optical fibers disposed in a second of the four compartments;
wherein the first bundle of optical fibers is visibly indistinguishable from the second bundle of optical fibers,
wherein at least one of the fins comprises indicia distinguishing the first bundle of optical fibers from the second bundle of optical fibers.

14. The fiber optic cable of claim 13, wherein the first bundle of optical fibers and the second bundle of optical fibers are color-coded, and
   wherein the first bundle of optical fibers and the second bundle of optical fibers are loose.

15. The fiber optic cable of claim 13, wherein the four compartments comprise two compartments having a first size and two compartments having a second size smaller than the first size.

16. The fiber optic cable of claim 13, wherein the indicia comprises one of a writing, an alphanumeric symbol, a marking, a code, a pattern, or a color coding.

17. The fiber optic cable of claim 13, wherein the optical fibers of the first bundle comprise a color coding scheme,
   wherein the optical fibers of the second bundle comprise the color coding scheme,
   wherein the optical fibers of the first bundle are disposed loose and randomly in the first compartment, and
   wherein the optical fibers of the second bundle are disposed loose and randomly in the second compartment.

18. The fiber optic cable of claim 15, wherein the first compartment and the second compartment have the first size, of indistinguishable shape and size to an unaided eye of a field service professional, and
   wherein a rigid strength member is disposed in one of the compartments having the second size.

19. The fiber optic cable of claim 15, wherein a respective glass reinforced strength member is disposed in each of the compartments having the second size.

20. The fiber optic cable of claim 15, wherein the first and second compartments have the first size, and wherein a third bundle of optical fibers is disposed in one of the compartments having the second size, the third bundle containing fewer optical fibers than the first and second bundles.

21. The fiber optic cable of claim 13, wherein at least one of the four fins comprises a detachable section.

22. The fiber optic cable of claim 13, wherein one or more of the four fins is perforated.

23. A fiber optic cable comprising:
a first set of color-coded optical fibers that are distinguishable from one another by color;
a second set of color-coded optical fibers that are distinguishable from one another by color, wherein each color-coded optical fiber of the second set has a counterpart of like color in the first set;
a first compartment, a second compartment, a third compartment, and a fourth compartment, each extending lengthwise; and
a jacket circumferentially covering the first and second sets of color-coded optical fibers and the first, second, third, and fourth compartments,
wherein the color-coded optical fibers of the first set are partitioned between the first and second compartments,
wherein the color-coded optical fibers of the second set are partitioned between the third and fourth compartments, and
wherein the partitioning of the color-coded optical fibers of the first set is different than the partitioning of the color-coded optical fibers of the second set.

* * * * *